United States Patent

Hirsch

[15] 3,670,335
[45] June 13, 1972

[54] ARRAYS WITH NULLS STEERED INDEPENDENTLY OF MAIN BEAM

[72] Inventor: Peter Hirsch, Parsippany, N.J.

[73] Assignee: Bell Telephone Laboratories, Incorporated, Murray Hill, Berkeley Heights, N.J.

[22] Filed: June 8, 1967

[21] Appl. No.: 644,539

[52] U.S. Cl..........................343/100 SA, 340/6 R, 343/16 R, 343/854
[51] Int. Cl. ..........................................................H01q 3/26
[58] Field of Search..........................................343/100.6, 854

[56] References Cited

UNITED STATES PATENTS 3,124,801  3/1964  Callahan, Jr...........................343/854

*Primary Examiner*—Benjamin A. Borchelt
*Assistant Examiner*—Richard E. Berger
*Attorney*—R. J. Guenther and William L. Keefauver

[57] ABSTRACT

The directions of selected nulls in the characteristic pattern of an array of signal converting elements are controlled independently of the direction of the main beam of this pattern and substantially independently of the strength of the main beam. This is done by constructing each signal converting element either of two mutually perpendicular dipole transducers and an omnidirectional transducer, or their equivalent. Array nulls are then rotated independently of the main beam by varying the relative weights given to the signals associated with the transducers comprising each element.

6 Claims, 5 Drawing Figures

INVENTOR
P. HIRSCH
ATTORNEY

ARRAYS WITH NULLS STEERED INDEPENDENTLY OF MAIN BEAM

BACKGROUND OF THE INVENTION

This invention relates to the reception and transmission of signals by arrays of receiving or transmitting elements. In particular, this invention relates to the control of the direction of selected array nulls independently of the direction of the main beam of an array of such elements.

Arrays of receiving or transmitting elements are well known, particularly in the fields of radar and acoustics. Often it is necessary that an array of receiving elements be particularly sensitive to signals received from a selected direction, and particularly insensitive to signals received from other directions. Conversely, it is often desirable that an array of transmitting elements be capable of transmitting a strong signal in one direction and a weak or no signal in other directions.

In particular, a signal coming from one direction is often masked by noise from another direction. To avoid difficulty in detecting the reception of such a signal, arrays of receiving elements have been built with maximum sensitivity in the direction of the signal and zero sensitivity, a so-called "null," in the direction of the noise. Such arrays are adequate when the location of the noise source is known and stationary relative to the location of the signal source. But when the direction of the noise source is not known in advance, or when the direction of the noise source varies with time relative to the direction of the signal source, such noise hinders the detection of the signal by the array.

Conversely, often an array of transmitting elements, by design, radiates maximum power to a first object in one direction, and little or no power to a second object in another direction. If the second object moves relative to the first object, the direction of minimum power transmission is not correct.

SUMMARY OF THE INVENTION

This invention partially overcomes the above problems by making it possible to steer the nulls of an array sensitivity pattern independently of the maximum sensitivity direction, or "main beam," of the array, without substantially affecting the main beam strength. This makes possible, for example, the detection of signals with lower signal-to-noise ratios than heretofore possible in the presence of moving directional noise sources.

According to this invention, each element in an array of receiving or transmitting elements — called, in general, signal converting elements — is composed either of two crossed dipole transducers and an omnidirectional transducer, or their equivalent. The signals associated with the crossed dipoles are appropriately weighted to produce a single dipole sensitivity pattern rotated to a selected direction. These weighted signals are then combined with the differentiated and weighted signal associated with the omnidirectional transducer. The sensitivity or power radiation pattern of the resulting combined signals is, in general, a hypercardioid with nulls in two directions symmetric about the direction of maximum sensitivity. The directions of the nulls are, according to this invention, easily rotated by varying the relative weighting of the signals associated with the omnidirectional and the dipole transducers.

To construct an array, several identical signal converting elements are combined, by a plurality of amplitude and phase adjusting networks, to a summing or splitting network through which the received or transmitted signal is sent. The strength and the direction of the main beam of the array are controlled in a well-known manner by the spacing of the elements in the array and by the relative phase relationship between, and gain of, the signals sent to, or received by, the elements.

While this invention will be described in terms of elements and arrays with sensitivity or power radiation patterns which are varied in only a single plane, the principles of this invention apply equally well to elements and arrays with sensitivity patterns which are varied in three dimensions.

This invention may be more fully understood from the following description, taken together with the attached drawings.

THEORY

Before describing the apparatus of this invention, the theory on which it is based will be explained. While this theory is based on the reception of a signal, an analogous theory can be derived for the transmission of a signal.

Figure 1A:
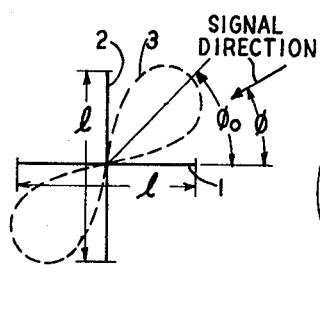
FIGS. 1A, 1B, and 1C show, respectively, the sensitivity or power radiating patterns of two crossed dipole transducers, an omnidirectional transducer, and two crossed dipole transducers combined with an omnidirectional transducer.

FIG. 1A shows schematically two mutually perpendicular dipole transducers 1,2. The output signal $g_1(t)$ from dipole 1 in response to a sinusoidal signal $\cos \omega t$ coming from the direction $\Phi$, as shown in FIG. 1A, for the case where the length $l$ of the dipole is small relative to the wavelength $\lambda$ of the signal, is $$g_1(t) = (-2\pi l/\lambda) \cos \Phi \sin \omega t . \quad (1)$$

Here, $\omega$ represents frequency, and $t$ represents time. The output signal $g_2(t)$ from dipole 2 under the same conditions is $$g_2(t) = (-2\pi l/\lambda) \sin \Phi \sin \omega t . \quad (2)$$

An examination of either Equation 1 or Equation 2 shows that for low frequency signals, a dipole transducer possesses a "Figure 8" sensitivity, or "characteristic," pattern with maximum sensitivity in a direction perpendicular to the direction of zero sensitivity.

If the output signals from two mutually perpendicular dipoles are correctly weighted, the sum of the two weighted output signals likewise has a "Figure 8" sensitivity pattern. However, in addition, this "Figure 8" sensitivity pattern can be rotated electronically to a selected direction merely by varying, in a prescribed manner, the weighting given to the output signals from the dipoles.

Thus, if $g_1(t)$ is weighted by an amount $\cos \Phi_o$ and if $g_2(t)$ is weighted by an amount $\sin \Phi_o$ and if the resulting weighted signals are added, the resulting sum signal $g_3(t)$ has a "Figure 8" sensitivity pattern with maximum sensitivity in the direction $\Phi_o$. Equation 3 represents this transformation.

$$g_3(t) = -(2\pi l/\lambda) \sin \omega t \cos (\Phi - \Phi_o) . \quad (3)$$

The "Figure 8" sensitivity pattern represented by Equation (3) is labeled 3 in FIG. 1A.

But, wavelength $\lambda = 2\pi c/\omega$, where $c$ is the propagation speed of the received signal. Thus, $$g_3(t) = -(l/c) \omega \sin \omega t \cos (\Phi - \Phi_o) . \quad (4)$$

Figure 1B:
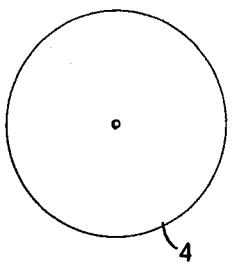

The output signal $g_4(t)$ from an omnidirectional transducer, that is, a transducer with uniform sensitivity in all directions is, as shown in FIG. 1B, in response to a signal $\cos \omega t$, $$g_4(t) = K \cos \omega t . \quad (5)$$

$K$ is the amplification of the signal detected by the omnidirectional transducer. Equation 4 shows that when the input signal to the dipole transducers and the omnidirectional transducer is $\cos \omega t$, the output signals from the dipoles are proportional to $-\omega \sin \omega t$. Thus, the dipoles effectively differentiate $\cos \omega t$ with respect to time.

If the output signal from the omnidirectional transducer is differentiated with respect to time, and then added to $g_3(t)$, the resulting sum signal $g_5(t)$ is given by $$g_5(t) = -\left\{K + \frac{l}{c} \cos (\Phi - \Phi_o)\right\} \omega \sin \omega t. \quad (6)$$

Equation 6 shows that the signal obtained by combining the output signals from two mutually perpendicular dipoles with the differentiated output signal from an omnidirectional transducer has a maximum strength when $\cos(\Phi - \Phi_o)$ equals unity. In addition, $g_5(t)$ has zero sensitivity, or nulls, when $$\cos (\Phi - \Phi_o) = -\frac{Kc}{l} . \quad (7)$$

Figure 1C:
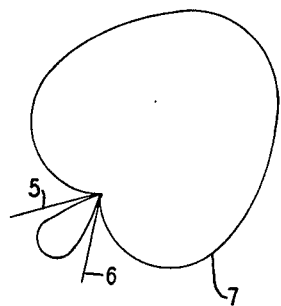

Therefore, by adjusting $K$, the amount by which the output signal from the omnidirectional transducer is amplified, to insure that the term $Kc/l = \beta$ is given by $-1 \leq \beta \leq 1$, the nulls in the sensitivity pattern of the combined crossed dipole transducers and the omnidirectional transducer can be rotated to any selected direction, as given by Equation (7). This so-called hypercardioid sensitivity pattern is shown in FIG. 1C. The directions of the nulls in this pattern are indicated by the lines 5 and 6. Simultaneously with this rotation of the nulls by varying $K$, the maximum sensitivity of the combined dipole and omnidirectional transducers can be independently rotated to any desired angle $\Phi_o$ by varying the amplitudes of the weighting terms $\cos \Phi_o$ and $\sin \Phi_o$.

Equation (6) shows that $g_5(t)$ is linearly proportional to frequency $\omega$. A weighting network can, if desired, be used to remove this frequency dependence within the range of frequencies for which Equation (6) is valid.

It should be noted that this same result can be obtained in alternative ways. For example, one can use two transducers with cardioid sensitivity patterns and a single dipole transducer to obtain an equivalent result. If the cardioid sensitivity patterns are represented by $H_1$ and $H_2$, respectively, where $$H_1 = 1 + \sin \Phi \qquad (8)$$
$$H_2 = 1 - \sin \Phi, \qquad (9)$$

and if the dipole sensitivity pattern is $$D_3 = (2\pi l/\lambda) \cos \Phi, \qquad (10)$$

then the output signals from the two hypercardioid transducers and the dipole transducer can likewise be combined to give an overall sensitivity pattern $H$ represented by $$H = \beta + \cos(\Phi - \Phi_o). \qquad (11)$$

The terms in these equations have been previously defined.

While these equations have been derived for two dimensions, they can be easily extended to three-dimensional space.

DETAILED DESCRIPTION

Figure 2:
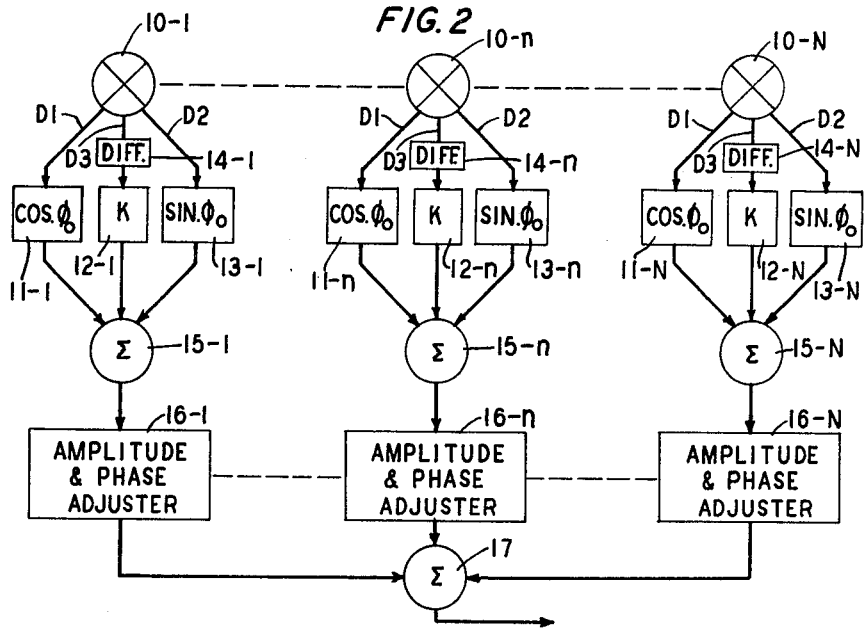
FIG. 2 is a schematic block diagram of an array constructed in accordance with this invention.

An array constructed in accordance with the principles of this invention is shown in FIG. 2. While the operation of this array will be discussed in terms of the reception of a signal, the principles of this invention also apply to the directional transmission of signals.

Receiving elements 10-1 through 10-N are each constructed either of two crossed dipole transducers and an omnidirectional transducer, or their equivalent, where N is an integer equal to the total number of elements in the array. Element 10-n in FIG. 2 has three output leads, D1 and D2 from the crossed dipoles, and D3 from the omnidirectional transducer. The output signal on lead D1 is weighted by $\cos \Phi_o$ in amplifier 11-n, where $\Phi_o$ represents the angle to which the "Figure 8" dipole sensitivity pattern is to be rotated. The output signal on lead D2 is weighted by $\sin \Phi_o$ in amplifier 13-n. The output signal on lead D3 from the omnidirectional transducer is differentiated in network 14-n and then is weighted an amount $K$, where $Kc/l = \beta$ varies from $-1 \leq \beta \leq 1$, in amplifier 12-n. The weighted signals from amplifiers 11-n, 12-n and 13-n are then combined in summing network 15-n to produce an output signal with a hypercardioid sensitivity pattern. This output signal is then passed through phase and amplitude adjusting network 16-n to insure that it is in the proper phase and amplitude relationship relative to the similarly processed output signals received from the other elements in the array.

The array itself has a sensitivity pattern which is a function of the number, the arrangement, and the gain of the receiving or transmitting elements in the array. The mathematics of calculating this pattern are described in an article by Schelkunoff, entitled "A Mathematical Theory of Linear Arrays" published in Volume 22, pages 80 to 107 of the Bell System Technical Journal, 1943. This sensitivity pattern usually has a main beam direction. But, in addition, if each element in the array has a sensitivity pattern with nulls at identical angles, the array sensitivity pattern has nulls at the same selected angles provided the sensitivity patterns of all the elements are identical.

As discussed by Schelkunoff and others, the array's main beam direction is controlled by adjusting the relative phase and amplitude of the signal transmitted or received by each element. However, in accordance with this invention, the nulls of each element, and thus of the array, are controlled electronically by adjusting the relative strengths of the signals from the dipole and omnidirectional transducers comprising each element. Thus, the array nulls are, according to this invention, varied without substantially affecting the main beam direction or strength.

Of course, to the extent that changing the direction of the nulls of each element changes the maximum sensitivity of each element, the strength of the main beam of the array is varied. But, I have discovered that this coupling of null direction with main beam strength is relatively weak for a fairly large range of angular variation in the nulls.

Figure 3:
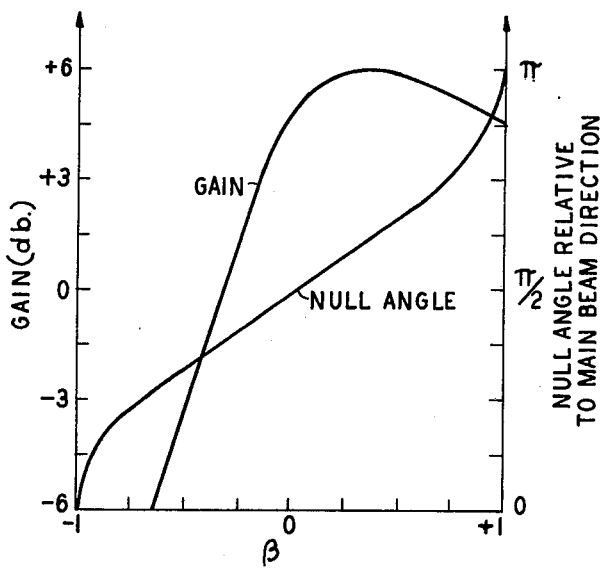
FIG. 3 shows the relationship between normalized main beam gain and array null direction, for an array of hypercardioid elements.

This is shown by FIG. 3, a plot of normalized main beam gain and null angle for an array of hypercardioid elements versus $\beta$, a parameter related, as described above, to the amplification $K$ of the signal from the omnidirectional transducers in these elements. FIG. 3 shows that only as the null angle approaches within $3\pi/8$ radians of the main beam direction, does the gain of the main beam drop more than 6 db from the maximum array gain.

Other embodiments incorporating the principles of this invention will be obvious to those skilled in signal processing.

What is claimed is:

1. Apparatus which comprises
    an array of signal converting elements, each element comprising a plurality of transducers with selectively different sensitivity patterns, said array possessing a sensitivity pattern containing both a main beam and nulls,
    means for controlling the direction and strength of said main beam of said array, and
    means for varying, substantially independently of the direction and strength of said main beam, the direction of selected nulls in the sensitivity pattern of said array.

2. Apparatus comprising: an array of signal converting elements, each element including a first transducer and a second transducer with mutually perpendicular "Figure 8" sensitivity patterns, and a third transducer with an omnidirectional sensitivity pattern; and means for selectively interconnecting said elements to develop a sensitivity pattern with maximum sensitivity in a selected direction and independently rotatable nulls in other directions.

3. Apparatus as in claim 2 further including
    means for weighting the signal associated with said first transducer by an amount $\cos \Phi_o$, where $\Phi_o$ is the desired direction of maximum sensitivity of said array,
    means for weighting the signal associated with said second transducer by an amount $\sin \Phi_o$, and
    means for weighting the signal associated with said third transducer by an amount $K$, where $K$ is proportional to the direction in which it is desired to rotate said nulls, thereby to give each of said elements in said array a hypercardioid sensitivity pattern with nulls steerable independently of the direction of said maximum sensitivity.

4. Apparatus which comprises
    an array of receiving elements, each element containing a first and a second transducer with mutually perpendicular "Figure 8" sensitivity patterns and a third transducer with an omnidirectional sensitivity pattern,
    means for weighting the output signals from said first transducers by the amount $\cos \Phi_o$ and the output signals from said second transducers by the amount $\sin \Phi_o$, thereby to rotate the direction of maximum sensitivity of said elements to the angle $\Phi_o$,
    means for differentiating the output signals from said third transducer, and for weighting said differentiated output signals by the amount $K$,
    a plurality of means, corresponding on a one-to-one basis to said receiving elements, for combining the weighted output signals from the first, second, and third transducers in each of said receiving elements, thereby to give each of said receiving elements a hypercardioid sensitivity pattern with nulls in directions determined by the magnitude of $K$, means for adjusting in phase and amplitude each of the combined output signals from said elements, and means for summing said phase and amplitude adjusted combined output signals to produce an array sensitivity pattern with nulls which can be controlled substantially independently of the strength and direction of its main beam.

5. Apparatus which comprises a signal receiving element comprising first and second mutually perpendicular dipole transducers and an omnidirectional transducer, means for weighting the signal received by said first dipole transducer by an amount $\cos \Phi_o$, means for weighting the signal received by said second dipole transducer by an amount $\sin \Phi_o$, means for differentiating, and weighting by the amount $K$, the signal received by said omnidirectional transducer, and means for combining said weighted signals, thereby to give said signal receiving element a sensitivity pattern with a main beam in the direction $\Phi_o$, and nulls in selected directions determined by the magnitude of $K$.

6. Apparatus which comprises a signal transmitting element comprising first and second mutually perpendicular dipole transducers and an omnidirectional transducer, means for sending a signal to be transmitted by said transmitting element along first, second, and third paths connected to said first and second dipole transducers and said omnidirectional transducer, respectively, means for weighting the signal on said first path by an amount $\cos \Phi_o$, means for weighting the signal on said second path by an amount $\sin \Phi_o$, and means for differentiating, and weighting by the amount $K$, the signal on said third path, thereby to give said transmitting element a power radiation pattern with a main beam in the direction $\Phi_o$, and nulls in selected directions determined by the magnitude of $K$.

* * * * *